(12) United States Patent
Frankenfield et al.

(10) Patent No.: US 12,271,368 B2
(45) Date of Patent: Apr. 8, 2025

(54) TECHNIQUES FOR DATA CORRELATION ACROSS DATA SOURCES

(71) Applicant: CloudFit Software, LLC, Redmond, WA (US)

(72) Inventors: Karch Anthony Frankenfield, Lynchburg, VA (US); Jeremy Robert Olachea, Lynchburg, VA (US)

(73) Assignee: CloudFit Software, LLC, Redmond, WA (US)

( * ) Notice: Subject to any disclaimer, the term of this patent is extended or adjusted under 35 U.S.C. 154(b) by 0 days.

(21) Appl. No.: 18/190,497

(22) Filed: Mar. 27, 2023

(65) Prior Publication Data

US 2024/0330268 A1 Oct. 3, 2024

(51) Int. Cl.
*G06F 16/23* (2019.01)

(52) U.S. Cl.
CPC ................. *G06F 16/2365* (2019.01)

(58) Field of Classification Search
None
See application file for complete search history.

(56) References Cited

U.S. PATENT DOCUMENTS

| | | | | |
|---|---|---|---|---|
| 11,012,326 | B1* | 5/2021 | Campbell | H04L 63/20 |
| 11,606,270 | B2* | 3/2023 | Campbell | H04L 63/20 |
| 2018/0301222 | A1* | 10/2018 | Dew, Sr. | G16H 15/00 |
| 2021/0243090 | A1* | 8/2021 | Campbell | G06F 9/547 |
| 2022/0014555 | A1* | 1/2022 | Crabtree | G06Q 10/103 |
| 2023/0208882 | A1* | 6/2023 | Crabtree | H04L 63/1408 726/22 |
| 2023/0216752 | A1* | 7/2023 | Campbell | H04L 43/0817 709/224 |
| 2023/0280882 | A1* | 9/2023 | Holmes | G06F 3/0481 |
| 2023/0370334 | A1* | 11/2023 | Mannengal | H04L 43/04 |
| 2023/0370452 | A1* | 11/2023 | Mannengal | H04L 63/20 |
| 2024/0195842 | A1* | 6/2024 | Crabtree | H04L 63/1441 |
| 2024/0202602 | A1* | 6/2024 | Crabtree | G06F 16/951 |
| 2024/0205266 | A1* | 6/2024 | Crabtree | G06Q 10/103 |
| 2024/0330268 | A1* | 10/2024 | Frankenfield | G06F 16/2365 |

* cited by examiner

*Primary Examiner* — Kim T Nguyen

(74) *Attorney, Agent, or Firm* — Lee & Hayes, P.C.

(57) ABSTRACT

Techniques for data correlation across data sources are presented herein. In some examples, a method includes the steps of retrieving a first datagram from a first data structure, wherein the first datagram represents a first update to a first data source; determining, by a first routine, a first correlation between the first datagram and a second datagram that is stored in a second data structure; based on determining the first correlation, updating the second datagram in accordance with first datagram; determining, by a second routine, whether the second datagram satisfies a completion condition; and based on determining that the second datagram satisfies the completion condition, storing the second datagram in the first data structure.

20 Claims, 10 Drawing Sheets

TECHNIQUES FOR DATA CORRELATION ACROSS DATA SOURCES

BACKGROUND

Performing data correlation in a real-time or near-real-time in manner is important for many critical data analytics applications, such as many applications related to monitoring of critical computer systems. However, conventional solutions for data correlation suffer from shortcomings that undermine efficiency, effectiveness, and/or operational speed of such solutions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
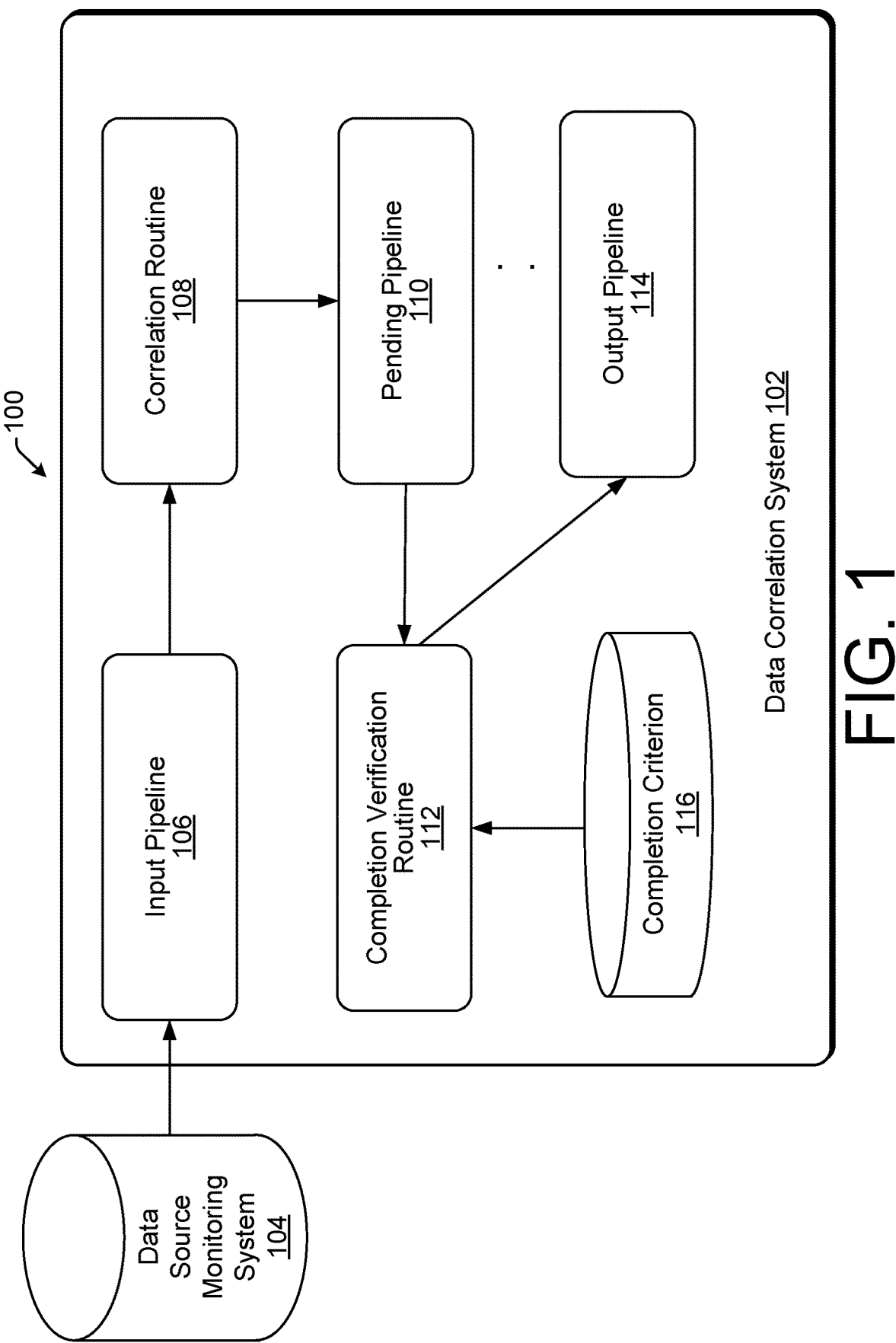
FIG. 1 is an example architecture for correlating data across a group of data sources.

This application presents techniques for correlating data across a group of data sources. In some examples, the techniques described herein enable a data correlation system to process a data source update based on whether the update correlates with previously-processed data source updates. By correlating data in response to data source updates, the data correlation system can perform data correlation across many data sources in a real-time, computationally efficient, and scalable manner, as further described below.

In some examples, a data monitoring system includes an input pipeline, a correlation routine, a pending pipeline, a completion verification routine, and an output pipeline. The input pipeline may receive datagrams corresponding to data source updates and store the received datagrams. The correlation routine may retrieve (e.g., receive, obtain, identify, query, and/or the like) a datagram from the input pipeline, determine whether the retrieved datagram correlates with an existing datagram stored in the pending pipeline, and update the pending pipeline based on the correlation determination. The completion verification routine may retrieve a datagram from the pending pipeline, determine whether the retrieved datagram satisfies a completion criterion, store a retrieved datagram in the output pipeline if the retrieved datagram satisfies the completion criterion, and maintain the retrieved datagram in the pending pipeline if the retrieved datagram fails to satisfy the completion criterion.

In some examples, the techniques described herein enable correlating data in response to data source updates. For example, when a data source monitoring system detects an update to a data source, the data source monitoring system may determine a first datagram corresponding to the update and store the first datagram on the input pipeline. Accordingly, the input pipeline may store data representing all unprocessed data source updates associated with a group of data sources. After the data source monitoring system stores the first datagram on the input pipeline, the correlation routine may process the first datagram to determine whether the datagram correlates with an existing datagram stored on the pending pipeline. In some examples, if the first datagram correlates with an existing datagram stored on the pending pipeline, the correlation routine updates the existing datagram based on the first datagram. However, if the first datagram does not correlate with an existing datagram stored on the pending pipeline, the correlation routine stores a new datagram on the pending pipeline based on the first datagram. Accordingly, the pending pipeline may store data representing all determined correlations across processed data source updates associated with the group of data sources. Moreover, the completion verification routine may retrieve a datagram from the pending pipeline, determine whether the retrieved datagram satisfies a completion criterion, and store the retrieved datagram on the output pipeline based on (e.g., in response to) determining that the retrieved datagram satisfies the completion criterion. Accordingly, the output pipeline may store data representing all fully-correlated data source updates associated with the group of data sources.

In some examples, the techniques described herein enable event processing in a real-time or near-real-time manner. For example, a data source update may correspond to a recorded event (e.g., a system monitoring event, such as a system security exposure event). In this example, after a data source monitoring system stores a first datagram corresponding to a recorded event on the input pipeline, the correlation routine may process the first datagram to determine whether the first datagram correlates with any datagrams stored on the pending pipeline. In some examples, a datagram stored on the pending pipeline represents a collection of one or more recorded events that the correlation routine has previously determined to be correlated. In some examples, the correlation routine may determine that a set of recorded events are correlated if they all relate to a common higher-order event (e.g., a system monitoring incident, such as a system security exposure incident). Accordingly, the pending pipeline may reflect the latest determinations about correlations across a set of recorded events associated with a set of distinct data sources. In some examples, the completion verification routine determines whether a datagram stored on the pending pipeline represents a fully-correlated set of events that includes adequate data about a higher-order event. If the completion verification routine determines that a datagram stored on the pending pipeline represents a fully-correlated set of events, the completion verification routine may store the datagram on the output pipeline. Accordingly, the output pipeline may store data representing higher-order events inferred from recorded events. In some examples, a post-correlation processing routine may use inferred higher-order events to perform post-correlation processing operations (e.g., to provide system monitoring incidents to an administrator of a monitored computer system).

An example application of various techniques described herein relates to system security monitoring for a monitored computer system. In some examples, a first datagram stored on the input pipeline represents one or more features associated with a recorded system security exposure event. For example, the first datagram may represent that a first component of the monitored computer system is under a denial of service (DoS) attack by an attacker system with a first Internet Protocol (IP) address and a first operating system. In this example application, the correlation unit may retrieve the first datagram from the input pipeline and determine that the first datagram correlates with a second datagram stored on the pending pipeline. For example, the second datagram may represent that a second component of the monitored system is under a DoS attack by an attacker system with the first IP address and from a first location. In response to determining the correlation between the first and second datagrams, the correlation unit may update the second datagram to integrate data associated with the first DoS attack. Accordingly, after the correlation routine updates the second datagram, the second datagram represents data associated with a system security event corresponding to a coordinated DoS attack across at least two components of the monitored computer system. Moreover, in this example application, the completion verification routine may determine which datagrams stored on the pending pipeline represents fully-correlated system security incidents and store those datagrams on the output pipeline. Accordingly, the output pipeline may represent data associated with fully-correlated system exposure events. In some examples, a post-correlation processing routine may provide data associated with the fully-correlated system exposure events, as represented by the output pipeline, to an administrator of the monitored computer system. In some examples, when a datagram stored on the output pipeline represents an incident, a post-correlation processing routine generates an incident alert in response to determining that the datagram satisfies an incident condition.

In some examples, the techniques described herein include using the input pipeline to store incoming datagrams associated with data source updates to a group of data sources. In some examples, the input pipeline stores data representing all unprocessed data source updates associated with a group of data sources. In some examples, a datagram stored on the input pipeline represents one or more features associated with a recorded event, such as a recorded system monitoring event (e.g., a recorded system security exposure event). The input pipeline may, for example, be a queue data structure, such as a queue data structure whose ordering is based on at least one of the times associated with the addition of the datagrams to the queue data structure or priorities associated with the datagrams stored in the queue data structure. The input pipeline can have an event emitter routine that, after the event emitter routine detects the addition of a new datagram in the input pipeline, provides a notification to a routine (e.g., to the correlation routine) subscribed to the event emitter routine.

In some examples, a datagram stored on the input pipeline is an enriched datagram resulting from performing one or more data enrichment operations on an unenriched datagram. In some examples, a data source monitoring system may perform a sequence of data enrichment operations on an unenriched datagram to determine an enriched datagram and subsequently store the enriched datagram on the input pipeline. For example, an unenriched datagram may represent a first IP address associated with a system security exposure event. In this example, to determine the enriched datagram, the data source monitoring system may perform the enrichment operation sequence $T_1 \rightarrow T_2 \rightarrow T_3$ on the unenriched datagram. For example, $T_1$ may be an enrichment operation associated with determining an internet provider of the IP address associated with an event, $T_2$ may be an enrichment operation associated with determining a security protocol associated with the determined internet provider, and $T_3$ may be an enrichment operation associated with determining a system exposure history associated with the determined security protocol. In some examples, after the data source monitoring system determines the enriched datagram, the system stores the enriched datagram on the input pipeline.

In some examples, the input pipeline is associated with a time-to-live (TTL) measure that reflects the maximum time that the input pipeline may store a datagram. In some examples, after the correlation routine determines that the input pipeline has stored a datagram for a time duration that exceeds the TTL measure, the routine removes the datagram from the input pipeline. In some examples, a datagram stored on the input pipeline is associated with a storage time field. In some examples, to determine the storage duration for a datagram stored on the input pipeline, the correlation routine computes a deviation measure between a current time and the storage time represented by the storage time field. In some examples, the correlation routine determines the storage duration based on the noted deviation measure.

In some examples, the techniques described herein include using the correlation routine to retrieve datagrams from the input pipeline. In some examples, the input pipeline is associated with an ordering of datagrams stored in the input pipeline, and the correlation routine retrieves datagrams stored in the input pipeline based on the ordering. In some examples, the ordering of the datagrams stored in the input pipeline can be based on at least one of the times associated with adding datagrams in the input pipeline or priorities associated with the datagrams stored in the input pipeline. In some examples, at a retrieval time, the correlation routine retrieves the initial datagram in the ordering from the input pipeline and subsequently removes the retrieved datagram from the input pipeline, so that the correlation routine retrieves a subsequent datagram in the ordering during a subsequent retrieval time.

In some examples, the correlation routine retrieves a datagram from the input pipeline after a thread associated with the correlation routine becomes available, such as after a computing unit first executes the correlation routine or after the thread determines whether a previously-retrieved datagram correlates with any of the datagrams stored in the pending pipeline. In some examples, the correlation routine is associated with two or more threads. Accordingly, the correlation routine may retrieve a datagram from the input pipeline before determining whether a previously-retrieved datagram correlates with any of the datagrams stored in the pending pipeline. In some examples, the correlation routine is associated with a single thread. Accordingly, the correlation routine may only retrieve a datagram from the input pipeline after determining whether a previously-retrieved datagram correlates with any of the datagrams stored in the pending pipeline. In some examples, the correlation routine retrieves a datagram from the input pipeline after the correlation routine receives a notification from an event emitter routine associated with the input pipeline, where the notification can represent that a data source monitoring system has stored a new datagram in the input pipeline.

In some examples, the correlation routine retrieves one or more datagrams from the input pipeline based on (e.g., in response to) receiving a notification from the event emitter routine of the input pipeline. In some examples, the notification represents at least one of the addition of one or more datagrams on the input pipeline. In some examples, based on receiving a notification from the event emitter routine of the input pipeline, the correlation routine retrieves all newly-added datagrams from the input pipeline.

In some examples, the techniques described herein include using the correlation unit to determine whether a datagram stored in the input pipeline correlates with any of the datagrams stored in the pending pipeline. In some examples, after the correlation unit retrieves a first datagram from the input pipeline, the correlation unit determines whether the first datagram correlates with (e.g., matches) any of the datagrams stored in the pending pipeline. The correlation routine may then update the pending pipeline based on the N correlation determinations.

In some examples, if the pending pipeline stores N datagrams, the correlation unit may perform N correlation determinations, each determining whether a datagram retrieved from the input pipeline correlates with a corresponding one of the N datagrams stored on the pending pipeline. In some examples, if the pending pipeline stores N datagrams, the correlation unit may perform up to N correlation determinations; for example, up to a first correlation determination leads to a determination that a datagram retrieved from the input pipeline correlates with a corresponding one of the N datagrams.

Accordingly, in some examples, the correlation routine performs one or more correlation determinations, each determining whether a datagram retrieved from the input pipeline correlates with a corresponding one of the datagrams stored on the pending pipeline. In some examples, to perform a correlation determination between a first datagram retrieved from the input pipeline and a second datagram stored on the pending pipeline, the correlation routine determines a subset of fields that match across the two datagrams. In some examples, after the correlation routine determines the subset of fields associated with the two datagrams, the correlation routine determines whether the subset satisfies a correlation condition associated with a correlation criterion. The correlation criterion may determine one or more correlation conditions, each correlation condition describing a set of fields. In some examples, if the correlation routine determines that the subset of fields associated with the first and second datagrams satisfies at least one of the correlation conditions, the correlation routine determines that the two datagrams are correlated. In some examples, after the correlation routine determines that the two datagrams are correlated, the routine updates the second datagram by integrating at least one field of the first datagram into the second datagram. In some examples, if the correlation routine determines that the subset of fields associated with the first and second datagrams fails to satisfy any of the correlation conditions in the correlation criterion, the correlation routine determines that the two datagrams are not correlated.

In some examples, the techniques described herein include storing datagrams processed by the correlation routine on the pending pipeline. In some examples, the pending pipeline may store data representing all determined correlations across processed data source updates associated with the group of data sources. In some examples, the pending pipeline may reflect the latest determinations about correlations across a set of recorded events (e.g., a set of system monitoring events) associated with a set of distinct data sources. The pending pipeline may, for example, be a queue data structure, such as a queue data structure whose ordering is based on at least one of the times associated with the addition of the datagrams to the queue data structure or priorities associated with the datagrams stored in the queue data structure. The pending pipeline can have an event emitter routine that, after the event emitter routine detects the addition of a new datagram in the pending pipeline, provides a notification to a routine (e.g., to the completion verification routine) subscribed to the event emitter routine.

In some examples, if the correlation routine determines that a first datagram retrieved from the input pipeline correlates with a second datagram stored on the pending pipeline, the correlation routine updates the second datagram in accordance with the second datagram. For example, the correlation routine may update the second datagram by integrating at least one field (e.g., all fields, non-matching fields, etc.) of the first datagram into the second datagram. In some examples, if the correlation routine determines that a first datagram retrieved from the input pipeline correlates with two or more second datagrams stored on the pending pipeline, the correlation routine updates each one of the two or more second datagrams in accordance with the second datagram. For example, the correlation routine may update each second datagram by integrating at least one field (e.g., all fields, non-matching fields, etc.) of the first datagram into the second datagram. Accordingly, in some examples, a datagram stored on the pending pipeline may represent data associated with a set of correlated datagrams.

In some examples, the pending pipeline is associated with a TTL measure reflecting the maximum time the pending pipeline may store a datagram. In some examples, after the completion verification routine determines that the pending pipeline has stored a datagram for a time duration that exceeds the TTL measure, the routine removes the datagram from the pending pipeline. In some examples, a datagram stored on the pending pipeline is associated with a storage time field. In some examples, to determine the storage duration for a datagram stored on the pending pipeline, the completion verification routine computes a deviation measure between a current time and the storage time represented by the storage time field. In some examples, the completion verification routine determines the storage duration based on the noted deviation measure.

In some examples, the techniques described include using a completion verification routine to retrieve datagrams from the pending pipeline. In some examples, the pending pipeline is associated with an ordering of datagrams stored in the enrichment pipeline, and the completion verification routine retrieves datagrams stored in the pending pipeline based on the ordering. In some examples, the ordering of datagrams stored in the pending pipeline can be determined based on at least one of the times associated with the addition of the datagrams in the pending pipeline or priorities associated with the datagrams stored in the pending pipeline. In some examples, at a retrieval time, the completion verification routine retrieves the initial datagram in the ordering from the pending pipeline and subsequently removes the retrieved datagram from the pending pipeline so that the completion verification routine retrieves a subsequent datagram in the ordering during a subsequent retrieval time.

In some examples, the completion verification routine retrieves a datagram from the pending pipeline after a thread associated with the completion verification routine becomes available, such as after the completion verification routine first executes or after the thread completes the determination of whether a previously-retrieved datagram satisfies a completion criterion. In some examples, the completion verification routine is associated with a single thread. Accordingly, the completion verification routine only retrieves a datagram from the pending pipeline after the completion verification routine determines that a previously-retrieved datagram satisfies a completion criterion. In some examples, a completion verification routine is associated with two or more threads. Accordingly, the completion verification routine can retrieve a datagram from the pending pipeline before the completion verification routine determines whether a previously-retrieved datagram satisfies a completion criterion. In some examples, the completion verification routine retrieves a datagram from the pending pipeline after the routine receives a notification from an event emitter routine associated with the pending pipeline, where the notification can represent that the correlation routine has newly updated a datagram or updated an existing datagram in the pending pipeline.

In some examples, the completion verification routine retrieves one or more datagrams from the pending pipeline based on (e.g., in response to) receiving a notification from the event emitter routine of the pending pipeline. In some examples, the notification represents at least one of: (i) the addition of one or more datagrams on the pending pipeline, or (ii) updating of one or more datagrams stored on the pending pipeline. In some examples, based on receiving a notification from the event emitter routine of the pending pipeline, the completion verification routine retrieves at least one of all newly-added or all newly-updated datagrams from the pending pipeline.

In some examples, the techniques described herein include using the completion verification routine to determine whether a datagram stored on the pending pipeline satisfies a completion criterion. In some examples, after the completion verification routine retrieves a datagram from the pending pipeline, the routine determines whether the retrieved datagram satisfies a completion criterion. The completion criterion may describe one or more completion conditions, each describing a set of fields. In some examples, the completion verification routine determines that a datagram satisfies a completion condition if the datagram includes all of the set of fields described by the completion condition. In some examples, the completion verification routine determines that a datagram satisfies a completion criterion if the datagram satisfies at least one completion condition associated with the completion criterion. In some examples, the completion verification routine determines that a datagram satisfies a completion criterion if the datagram satisfies at least M completion conditions associated with the completion criterion (where M may be a hyperparameter of the completion verification routine).

In some examples, based on (e.g., in response to) determining that a datagram retrieved from the pending pipeline satisfies the completion criterion, the completion verification routine stores the datagram on the output pipeline. In some examples, based on (e.g., in response to) determining that a datagram retrieved from the pending pipeline satisfies the completion criterion, the completion verification removes the datagram from the pending pipeline. In some examples, based on (e.g., in response to) determining that a datagram retrieved from the pending pipeline fails to satisfy the completion criterion, the completion verification routine maintains the datagram on the pending pipeline.

In some examples, techniques described herein include storing a datagram in an output pipeline. In some examples, after retrieving a datagram from the pending pipeline, the completion verification routine stores the datagram in the output pipeline based on a determination that the datagram satisfies a completion criterion. The output pipeline can be a queue data structure. In some examples, the output pipeline is associated with ordering the datagrams in the output pipeline. The ordering may be determined, for example, based on at least one of the times associated with the addition of the datagrams in the output pipeline or priorities associated with the datagrams stored in the output pipeline. The output pipeline can be associated with an event emitter routine that provides a notification to a routine (e.g., to a post-correlation processing routine) subscribed to the event emitter routine after the event emitter routine detects that the completion verification routine has added a new datagram to the output pipeline.

In some examples, the techniques described herein include performing post-correlation operations based on a datagram on the output pipeline representing a fully-correlated set of data source updates. In some examples, after the completion verification routine determines that a datagram is fully correlated and stores the datagram on the output pipeline, a post-correlation processing routine uses the datagram along with other datagrams (e.g., other datagrams retrieved from the output pipeline) and/or other data to determine a higher-order data source update (e.g., a higher-order event). The post-correlation processing routine can provide the higher-order data source update to an administrator of a monitored system event. In some examples, the post-correlation processing routine uses the higher-order data source updates to monitor a computer system in real-time and/or near real-time (e.g., to enable more robust and secure computer system administration).

In some examples, the techniques described herein can increase the computational efficiency of performing data correlation. Various techniques described herein enable performing data correlation in response to data source updates. This responsive approach to data correlation reduces the need for performing data correlation using computationally complex operations such as database join operations. Unlike those complex operations, the responsive operations described herein compare data sources incrementally and over time rather than holistically and at once. As a result, the techniques described herein can increase the computational efficiency of performing data correlation by performing data correlation in response to data source updates and reducing the need for performing data correlation using computationally complex operations such as database join operations.

In some examples, the techniques described herein can enhance the scalability of a data correlation solution. Conventional data correlation solutions that rely on holistic correlation approaches (e.g., database join operations) become more and more unfeasible as the size of the data increases. In contrast, various techniques described herein enable performing data correlation in response to data source updates. Accordingly, the responsive operations described herein compare data sources incrementally and over time rather than holistically and at once. As a result, the techniques described herein can increase make performing data correlation more scalable by performing data correlation using responsive and incremental approaches.

The methods, apparatuses, and systems described herein can be implemented in several ways. Examples are provided below with reference to the appended figures. Although discussed in the context of data enrichment, the methods, apparatuses, and systems described herein can be applied to a variety of data processing systems that perform sequential processing of datagrams using a set of data processing routines. Moreover, although various examples are described in relation to event processing domains (e.g., with respect to system exposure events), a person of ordinary skill in the relevant technology will recognize that various techniques described herein can be used to perform data processing operations and/or data enrichment operations in other application domains.

FIG. 1 is an example architecture 100 for correlating data across a group of data sources. As depicted in FIG. 1, the architecture 100 includes a data correlation system 102 and a data source monitoring system 104.

The data correlation system 102 is configured to process a data source update based on whether the update correlates with previously-processed data source updates. In particular, the data correlation system 102 may receive a datagram from the data source monitoring system 104 that represents a data source update, such as a data source update that corresponds to a recorded event (e.g., a system monitoring event, such as a system security exposure event). In some examples, a datagram received from the data source monitoring system 104 represents one or more features associated with a recorded system security exposure event. For example, the datagram received from the data source monitoring system 104 may represent that a first component of the monitored computer system is under a DoS attack by an attacker system with a first IP address and a first operating system. In some examples, a datagram received from the data source monitoring system 104 is an enriched datagram resulting from performing one or more data enrichment operations on an unenriched datagram representing a recorded data source update.

The data source monitoring system 104 is configured to monitor updates to one or more data sources and determine a datagram based on a recorded change to a data source. While the example implementation depicted in FIG. 1 includes one data source monitoring system 104, a person of ordinary skill in the relevant technology will recognize that the architecture 100 any number of data source monitoring systems. In some examples, given S data sources, the architecture includes S corresponding data source monitoring systems, each being configured to monitor updates to a corresponding one of the S data sources.

In some examples, to determine the first datagram, the data source monitoring system 104 may perform a sequence of data enrichment operations on an unenriched datagram to determine an enriched datagram representing a data source update and subsequently provide the enriched datagram to the data correlation system 102. For example, an unenriched datagram may represent a first IP address associated with a system security exposure event. In this example, to determine the enriched datagram, the data source monitoring system may perform the enrichment operation sequence $T_1 \rightarrow T_2 \rightarrow T_3$ on the unenriched datagram. For example, $T_1$ may be an enrichment operation associated with determining an internet provider of the IP address associated with an event, $T_2$ may be an enrichment operation associated with determining a security protocol associated with the determined internet provider, and $T_3$ may be an enrichment operation associated with determining a system exposure history associated with the determined security protocol. In some examples, after the data source monitoring system determines the enriched datagram, the system stores the enriched datagram on the input pipeline.

In some examples, the data correlation system 102 includes an input pipeline 106, a correlation routine 108, a pending pipeline 110, a completion verification routine 112, an output pipeline 114, and a completion criterion 116. In some examples, the input pipeline 106 stores data representing all unprocessed data source updates associated with a group of data sources. In some examples, a datagram stored on the input pipeline 106 represents one or more features associated with a recorded event, such as a recorded system monitoring event (e.g., a recorded system security exposure event). In some examples, the input pipeline 106 is associated with a TTL measure that reflects the maximum time that the input pipeline 106 may store a datagram.

The input pipeline 106 may, for example, be a queue data structure, such as a queue data structure whose ordering is based on at least one of the times associated with the addition of the datagrams to the queue data structure or priorities associated with the datagrams stored in the queue data structure. The input pipeline 106 can have an event emitter routine that, after the event emitter routine detects the addition of a new datagram in the input pipeline, provides a notification to a routine (e.g., to the correlation routine 108) subscribed to the event emitter routine.

In some examples, a datagram stored on the input pipeline 106 is an enriched datagram resulting from performing one or more data enrichment operations on an unenriched datagram. In some examples, the data source monitoring system 104 may perform a sequence of data enrichment operations on an unenriched datagram to determine an enriched datagram and subsequently store the enriched datagram on the input pipeline 106.

In some examples, the correlation routine 108 is configured to retrieve a datagram from the input pipeline 106, determine whether the retrieved datagram correlates with a datagram stored on the pending pipeline 110, and update the pending pipeline 110 based on the correlation determination. In some examples, the correlation routine 108 retrieves one or more datagrams from the input pipeline 106 based on (e.g., in response to) receiving a notification from the event emitter routine of the input pipeline 106. In some examples, the notification represents at least one of the addition of one or more datagrams on the input pipeline 106. In some examples, based on receiving a notification from the event emitter routine of the input pipeline 106, the correlation routine 108 retrieves all newly-added datagrams from the input pipeline 106.

In some examples, the correlation routine 108 is configured to retrieve a datagram from the input pipeline 106 based on an arrangement of the datagrams stored on the input pipeline 106. For example, the input pipeline 106 may be associated with an ordering of datagrams stored in the input pipeline, and the correlation routine 108 may retrieve datagrams stored in the input pipeline 106 based on the ordering. In some examples, the ordering of the datagrams stored in the input pipeline 106 can be based on at least one of the times associated with adding datagrams in the input pipeline or priorities associated with the datagrams stored in the input pipeline. In some examples, at a retrieval time, the correlation routine 108 retrieves the initial datagram in the ordering from the input pipeline 106 and subsequently removes the retrieved datagram from the input pipeline 106, so that the correlation routine 108 retrieves a subsequent datagram in the ordering during a subsequent retrieval time.

In some examples, after the correlation routine 108 retrieves a first datagram from the input pipeline 106, the correlation routine 108 determines whether the first datagram correlates with (e.g., matches) any of the datagrams stored in the pending pipeline 110. The correlation routine 108 may then update the pending pipeline 110 based on the N correlation determinations. In some examples, based on determining that the first datagram correlates with a second datagram stored on the pending pipeline 110, the correlation routine 108 updates the second datagram in accordance with the first datagram (e.g., to integrate one or more fields of the first datagram). In some examples, based on determining that the first datagram fails to correlate with any datagram stored on the pending pipeline 110, the correlation routine 108 adds the first datagram to the pending pipeline 110. In some examples, based on determining that the pending pipeline 110 is empty (e.g., does not include any datagrams), the correlation routine 108 adds the first datagram retrieved from the input pipeline 106 to the pending pipeline 110.

In some examples, the correlation routine 108 performs one or more correlation determinations, each determining whether a datagram retrieved from the input pipeline 106 correlates with a corresponding one of the datagrams stored on the pending pipeline 110. In some examples, to determine correlation between a first datagram retrieved from the input pipeline 106 and a second datagram stored on the pending pipeline 110, the correlation routine 108 determines a subset of fields that match across the two datagrams. In some examples, after the correlation routine 108 determines the subset of fields associated with the two datagrams, the correlation routine 108 determines whether the subset satisfies a correlation condition associated with a correlation criterion. The correlation criterion may determine one or more correlation conditions, each correlation condition describing a set of fields. In some examples, a storage unit in the data correlation system 102 and/or remote from the data correlation system 102 stores the correlation criterion.

In some examples, if the correlation routine 108 determines that the subset of fields associated with the first and second datagrams satisfies at least one of the correlation conditions, the correlation routine determines that the two datagrams are correlated. In some examples, after the correlation routine 108 determines that the two datagrams are correlated, the correlation routine 108 updates the second datagram by integrating at least one field of the first datagram into the second datagram. In some examples, if the correlation routine 108 determines that the subset of fields associated with the first and second datagrams fails to satisfy any of the correlation conditions in the correlation criterion, the correlation routine 108 determines that the two datagrams are not correlated.

In some examples, the pending pipeline 110 stores data representing all determined correlations across processed data source updates associated with the group of data sources. In some examples, the pending pipeline 110 may reflect the latest determinations about correlations across a set of recorded events (e.g., a set of system monitoring events) associated with a set of distinct data sources. In some examples, the pending pipeline 110 is associated with a TTL measure reflecting the maximum time the pending pipeline 110 may store a datagram.

In some examples, the pending pipeline 110 may be a queue data structure, such as a queue data structure whose ordering is based on at least one of the times associated with the addition of the datagrams to the queue data structure or priorities associated with the datagrams stored in the queue data structure. The pending pipeline 110 can have an event emitter routine that, after the event emitter routine detects the addition of a new datagram in the pending pipeline, provides a notification to a routine (e.g., to the completion verification routine 112) subscribed to the event emitter routine.

In some examples, to update the pending pipeline 110, the data correlation system 102 uses the correlation routine 108. In some examples, if the correlation routine 108 determines that a first datagram retrieved from the input pipeline 106 correlates with a second datagram stored on the pending pipeline 110, the correlation routine 108 updates the second datagram in accordance with the second datagram. For example, the correlation routine 108 may update the second datagram by integrating at least one field (e.g., all fields, non-matching fields, etc.) of the first datagram into the second datagram. In some examples, if the correlation routine 108 determines that a first datagram retrieved from the input pipeline 106 correlates with two or more second datagrams stored on the pending pipeline 110, the correlation routine 108 updates each one of the two or more second datagrams in accordance with the second datagram. For example, the correlation routine 108 may update each second datagram by integrating at least one field (e.g., all fields, non-matching fields, etc.) of the first datagram into the second datagram. Accordingly, in some examples, a datagram stored on the pending pipeline 110 may represent data associated with a set of correlated datagrams.

In some examples, the completion verification routine 112 is configured to retrieve a datagram from the pending pipeline 110, determine whether the retrieved datagram satisfies the completion criterion 116, and update the output pipeline 114 based on the completion determination. In some examples, based on (e.g., in response to) determining that a datagram retrieved from the pending pipeline satisfies the completion criterion 116, the completion verification routine 112 stores the datagram on the output pipeline 114. In some examples, based on (e.g., in response to) determining that a datagram retrieved from the pending pipeline 110 satisfies the completion criterion 116, the completion verification routine removes the datagram from the pending pipeline. In some examples, based on (e.g., in response to) determining that a datagram retrieved from the pending pipeline fails to satisfy the completion criterion, the completion verification maintains the datagram on the pending pipeline 110.

In some examples, the completion verification routine 112 retrieves a datagram from the pending pipeline 110. In some examples, the completion verification routine 112 retrieves one or more datagrams from the pending pipeline 110 based on (e.g., in response to) receiving a notification from the event emitter routine of the pending pipeline 110. In some examples, the notification represents at least one of: (i) the addition of one or more datagrams on the pending pipeline 110, or (ii) updating of one or more datagrams stored on the pending pipeline 110. In some examples, based on receiving a notification from the event emitter routine of the pending pipeline 110, the completion verification routine 112 retrieves at least one of all newly-added or all newly-updated datagrams from the pending pipeline 110.

In some examples, after the completion verification routine 112 retrieves a datagram from the pending pipeline 110, the completion verification routine 112 determines whether the retrieved datagram satisfies a completion criterion 116. The completion criterion 116 may describe one or more completion conditions, each describing a set of fields. In some examples, the completion verification routine 112 determines that a datagram satisfies a completion condition if the datagram includes all the set of fields described by the completion condition. In some examples, the completion verification routine 112 determines that a datagram satisfies a completion criterion 116 if the datagram satisfies at least one completion condition associated with the completion criterion 116. In some examples, the completion verification routine 112 determines that a datagram satisfies a completion criterion 116 if the datagram satisfies at least M completion conditions associated with the completion criterion 116.

In some examples, the output pipeline 114 stores all fully-correlated datagrams. In some examples, after retrieving a datagram from the pending pipeline, the completion verification routine 112 stores the datagram in the output pipeline 114 based on a determination that the datagram satisfies the completion criterion 116. The output pipeline 114 can be a queue data structure. In some examples, the output pipeline 114 is associated with ordering the datagrams in the output pipeline 114. The ordering may be determined, for example, based on at least one of the times associated with the addition of the datagrams in the output pipeline 114 or priorities associated with the datagrams stored in the output pipeline 114. The output pipeline 114 can be associated with an event emitter routine that provides a notification to a routine (e.g., to a post-correlation processing routine) subscribed to the event emitter routine after the event emitter routine detects that the completion verification routine has added a new datagram to the output pipeline 114. In some examples, after the completion verification routine 112 determines that a datagram is fully correlated and stores the datagram on the output pipeline 114, a post-correlation processing routine uses the datagram along with other datagrams (e.g., other datagrams retrieved from the output pipeline 114) and/or other data to determine a higher-order data source update (e.g., a higher-order event). The post-correlation processing routine can provide the higher-order data source update to an administrator of a monitored system event. In some examples, the post-correlation processing routine uses the higher-order data source updates to monitor a computer system in real-time and/or near real-time (e.g., to enable more robust and secure computer system administration).

Figure 2:
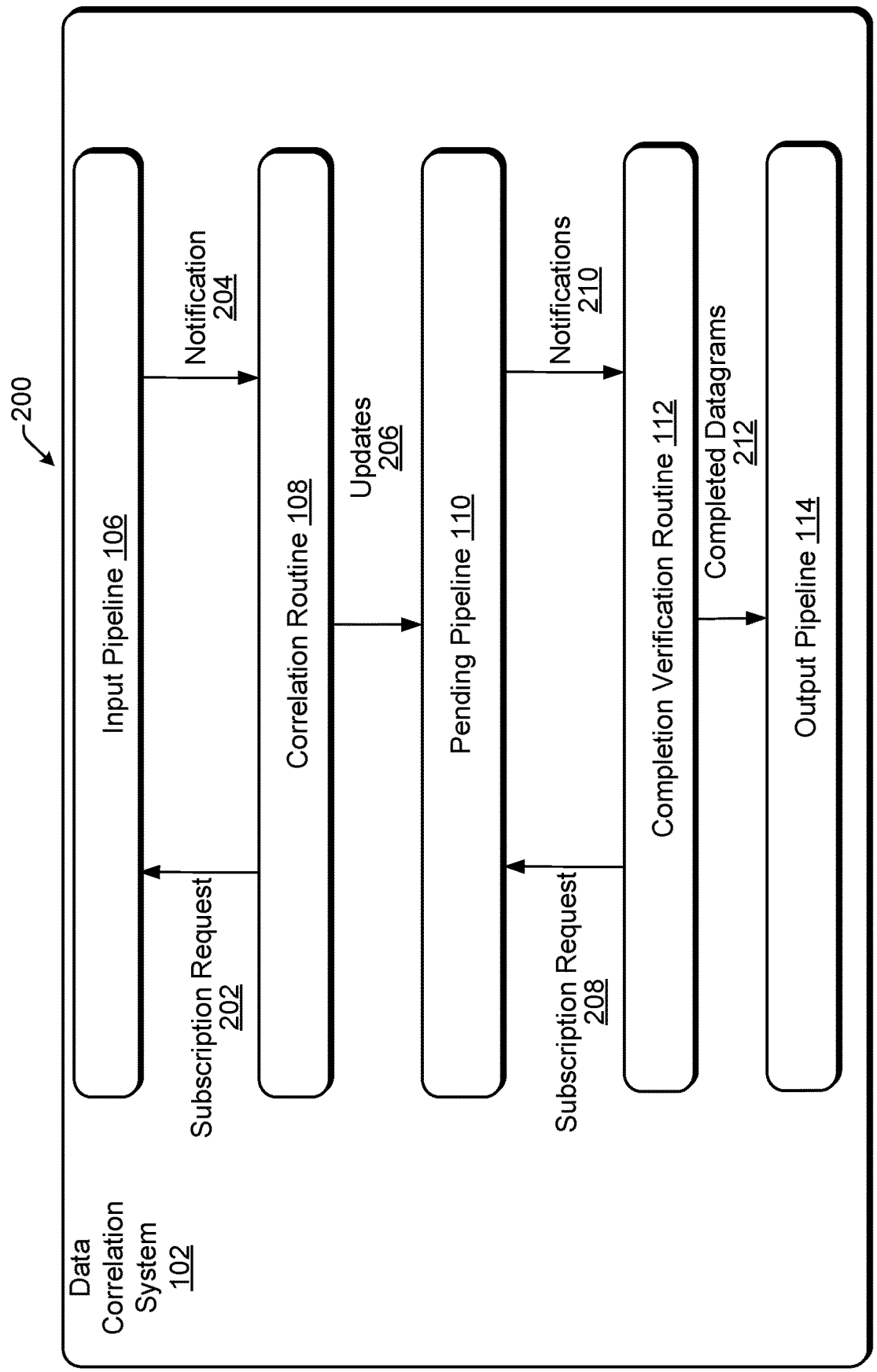
FIG. 2 is a data flow diagram of an example process performed by A data correlation system to enable correlating data across a group of data sources.

FIG. 2 is a data flow diagram of an example process 200 performed by the data correlation system 102 to enable correlating data across a group of data sources. As depicted in FIG. 2, the process 200 includes operations performed by the correlation routine 108 to transmit a subscription request 202 to the input pipeline 106 to subscribe to an event emitter routine of the input pipeline 106. After the correlation routine 108 subscribes to the input pipeline 106 via the subscription request 202, the correlation routine 108 can receive notifications 204 when the data source correlation system 104 adds one or more new datagrams to the input pipeline 106. After the event emitter routine of the input pipeline 106 detects the addition of a new datagram in the input pipeline 106, the event emitter routine provides a notification 204 to any routine subscribed to the event emitter routine.

As further depicted in FIG. 2, the process 200 includes operations performed by the correlation routine 108 to provide updates 206 the pending pipeline 110. Each update 206 either adds a new datagram to the pending pipeline 110 or updates/modifies an existing datagram in the pending pipeline 110. In some examples, after the correlation routine 108 retrieves a first datagram from the input pipeline 106, the correlation routine 108 determines whether the first datagram correlates with (e.g., matches) any of the datagrams stored in the pending pipeline 110. The correlation routine 108 may then provide updates 206 to the pending pipeline 110 based on the N correlation determinations. In some examples, based on determining that the first datagram correlates with a second datagram stored on the pending pipeline 110, the correlation routine 108 updates the second datagram in accordance with the first datagram (e.g., to integrate one or more fields of the first datagram).

As further depicted in FIG. 2, the process 200 includes operations performed by the completion verification routine 112 to transmit a subscription request 208 to the pending pipeline 110 to subscribe to an event emitter routine of the pending pipeline 110. After the completion verification routine 112 subscribes to the pending pipeline 110 via the subscription request 208, completion verification routine 112 can receive notifications 210 when the correlation routine 108 adds one or more new datagrams to the pending pipeline 110 or changes one or more existing datagrams in the pending pipeline 110. After the event emitter routine of the pending pipeline 110 detects the addition of a new datagram in the pending pipeline 110, the event emitter routine provides a notification 210 to any routine subscribed to the event emitter routine.

As further depicted in FIG. 2, the process 200 includes operations performed by the completion verification routine 112 to store completed datagrams 212 in the output pipeline 114. In some examples, after determining that a datagram stored in the pending pipeline satisfies the completion criterion 116, the completion verification routine 112 determines that the datagram is a completed datagram 212 and stores the completed datagram 212 in the output pipeline.

Figure 3:
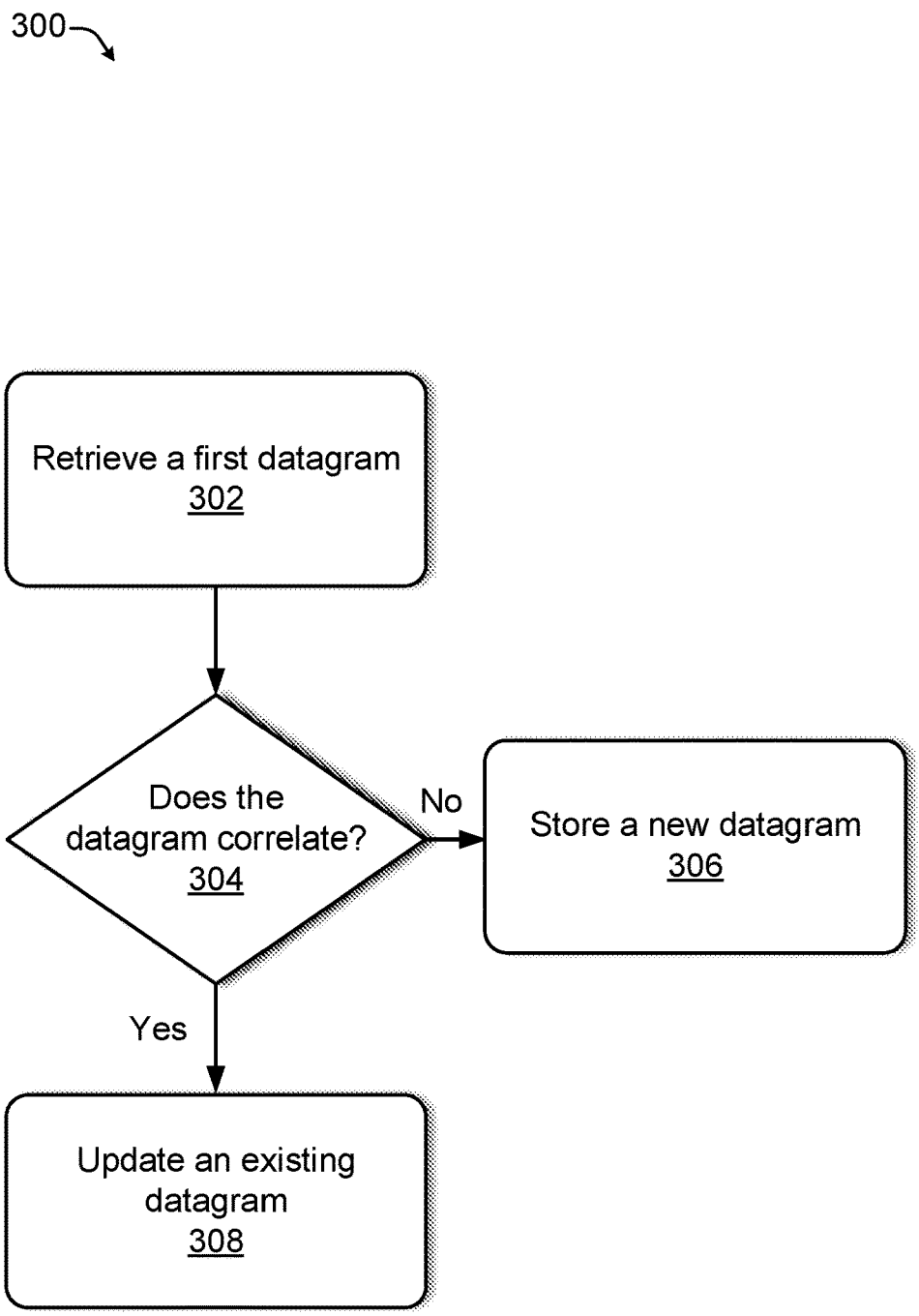
FIG. 3 is a flowchart diagram of an example process for performing operations of a correlation routine.

FIG. 3 is a flowchart diagram of an example process 300 for performing operations of a correlation routine (e.g., the correlation routine 108 of the data correlation system 102 of FIGS. 1-2). As depicted in FIG. 3, at operation 302, the process 300 includes retrieving a first datagram from an input pipeline (e.g., the input pipeline of the data correlation system 102 of FIGS. 1-2). In some examples, the correlation routine retrieves a datagram from the input pipeline after the correlation routine receives a notification from an event emitter routine associated with the input pipeline, where the notification can represent that a data source monitoring system has stored a new datagram in the input pipeline.

In some examples, the correlation routine retrieves a datagram from the input pipeline after a thread associated with the correlation routine becomes available, such as after a computing unit first executes the correlation routine or after the thread determines whether a previously-retrieved datagram correlates with any of the datagrams stored in the pending pipeline. In some examples, the correlation routine is associated with two or more threads. Accordingly, the correlation routine may retrieve a datagram from the input pipeline before determining whether a previously-retrieved datagram correlates with any of the datagrams stored in the pending pipeline. In some examples, the correlation routine is associated with a single thread. Accordingly, the correlation routine may only retrieve a datagram from the input pipeline after determining whether a previously-retrieved datagram correlates with any of the datagrams stored in the pending pipeline.

At operation 304, the process 300 includes determining whether the first datagram correlates with at least one datagram stored on a pending pipeline (e.g., the pending pipeline 110 of the data correlation system 102 of FIGS. 1-2). In some examples, if the pending pipeline stores N datagrams, the correlation unit may perform N correlation determinations, each determining whether a datagram retrieved from the input pipeline correlates with a corresponding one of the N datagrams stored on the pending pipeline. In some examples, if the pending pipeline stores N datagrams, the correlation unit may perform up to N correlation determinations; for example, up to a first correlation determination leads to a determination that a datagram retrieved from the input pipeline correlates with a corresponding one of the N datagrams.

At operation 306, the process 300 includes storing the first datagram as a new datagram on the pending pipeline based on (e.g., in response to) determining that the first datagram fails to correlate with any datagrams stored on the pending pipeline. Accordingly, if the first datagram does not correlate with an existing datagram stored on the pending pipeline, the correlation routine stores a new datagram on the pending pipeline based on the first datagram.

At operation 308, the process 300 includes updating an existing datagram of the pending pipeline (e.g., in response to) determining that the first datagram fails correlates with at least one of the datagrams stored on the pending pipeline. In some examples, if the correlation routine determines that a first datagram retrieved from the input pipeline correlates with a second datagram stored on the pending pipeline, the correlation routine updates the second datagram in accordance with the second datagram. For example, the correlation routine may update the second datagram by integrating at least one field (e.g., all fields, non-matching fields, etc.) of the first datagram into the second datagram. In some examples, if the correlation routine determines that a first datagram retrieved from the input pipeline correlates with two or more second datagrams stored on the pending pipeline, the correlation routine updates each one of the two or more second datagrams in accordance with the second datagram.

Figure 4:
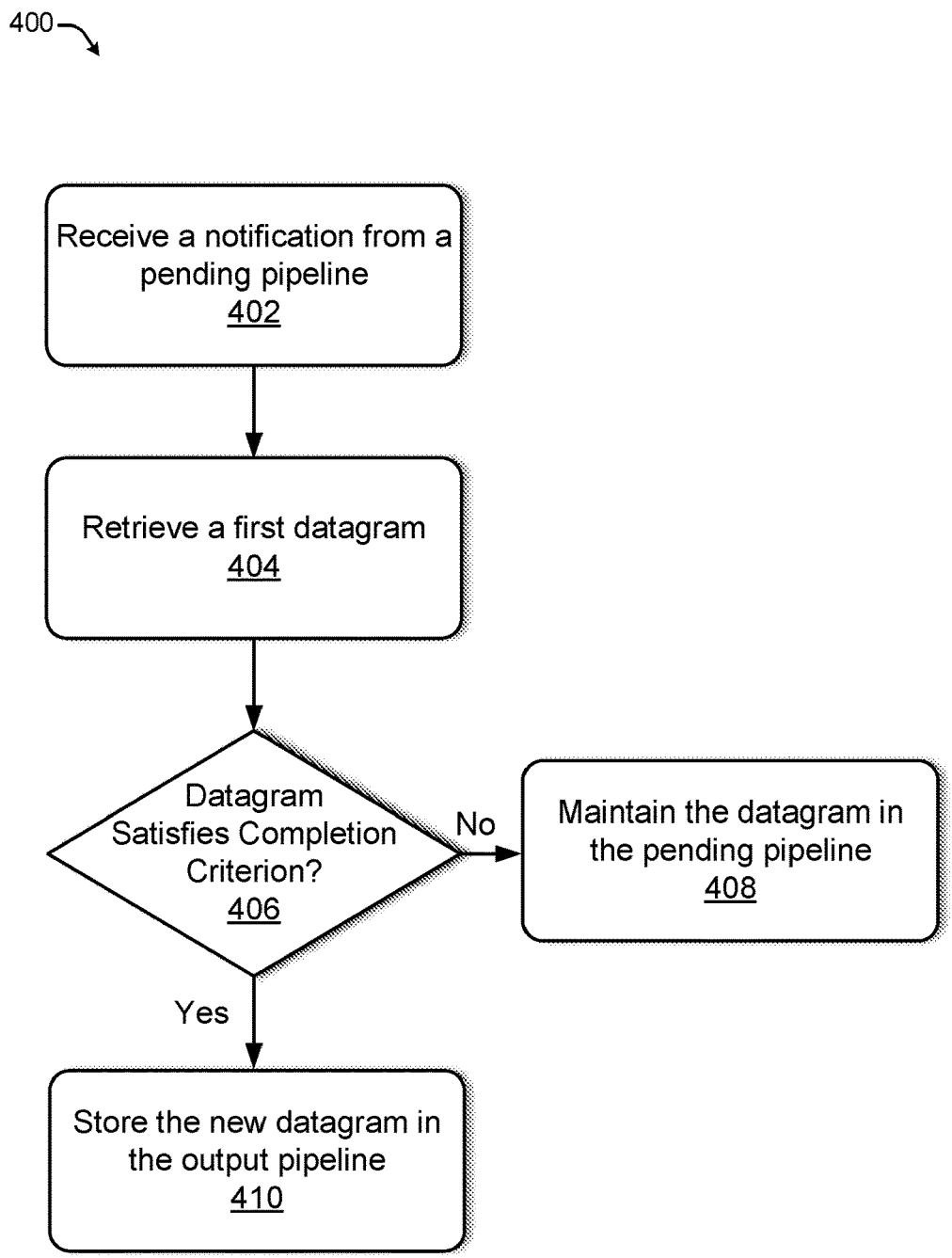
FIG. 4 is a flowchart diagram of an example process for performing operations of a completion verification routine.

FIG. 4 is a flowchart diagram of an example process 400 for performing operations of a completion verification routine (e.g., the completion verification routine 112 of the data correlation system 102 of FIGS. 1-2). As depicted in FIG. 4, at operation 402, the process 400 includes receiving a notification from a pending pipeline (e.g., the pending pipeline 110 of the data correlation system 102 of FIGS. 1-2). In some examples, the pending pipeline has an event emitter routine that, after the event emitter routine detects the addition of a new datagram in the pending pipeline, provides a notification to a routine (e.g., to the completion verification routine) subscribed to the event emitter routine.

At operation 404, the process 400 includes retrieving a first datagram from the pending pipeline. In some examples, the completion verification routine retrieves one or more datagrams from the pending pipeline based on (e.g., in response to) receiving a notification from the event emitter routine of the pending pipeline. In some examples, the notification represents at least one of: (i) the addition of one or more datagrams on the pending pipeline, or (ii) updating of one or more datagrams stored on the pending pipeline. In some examples, based on receiving a notification from the event emitter routine of the pending pipeline, the completion verification routine retrieves at least one of all newly-added or all newly-updated datagrams from the pending pipeline.

At operation 406, the process 400 includes determining whether the first datagram satisfies a completion criterion (e.g., the completion criterion 116 of the data correlation system 102 of FIG. 1). The completion criterion may describe one or more completion conditions, each describing a set of fields. In some examples, the completion verification routine determines that a datagram satisfies a completion condition if the datagram includes all the set of fields described by the completion condition. In some examples, the completion verification routine determines that a datagram satisfies a completion criterion if the datagram satisfies at least one completion condition associated with the completion criterion.

At operation 408, the process 400 includes maintaining the first datagram in the pending pipeline based on (e.g., in response to) determining that the first datagram does not satisfy the completion criterion. In some examples, based on (e.g., in response to) determining that a datagram retrieved from the pending pipeline fails to satisfy the completion criterion, the completion verification routine maintains the datagram on the pending pipeline.

At operation 410, the process 400 includes storing the first datagram in the output pipeline (e.g., the output pipeline 114 of the data correlation system 102 of FIGS. 1-2) based on (e.g., in response to) determining that the first datagram satisfies the completion criterion. In some examples, based on (e.g., in response to) determining that a datagram retrieved from the pending pipeline satisfies the completion criterion, the completion verification routine stores the datagram on the output pipeline. In some examples, based on (e.g., in response to) determining that a datagram retrieved from the pending pipeline satisfies the completion criterion, the completion verification removes the datagram from the pending pipeline.

Figure 5:
FIG. 5 provides an operational example of storing two datagrams in an input pipeline while a pending pipeline and an output pipeline are empty.
Figure 5:
Figure 5:
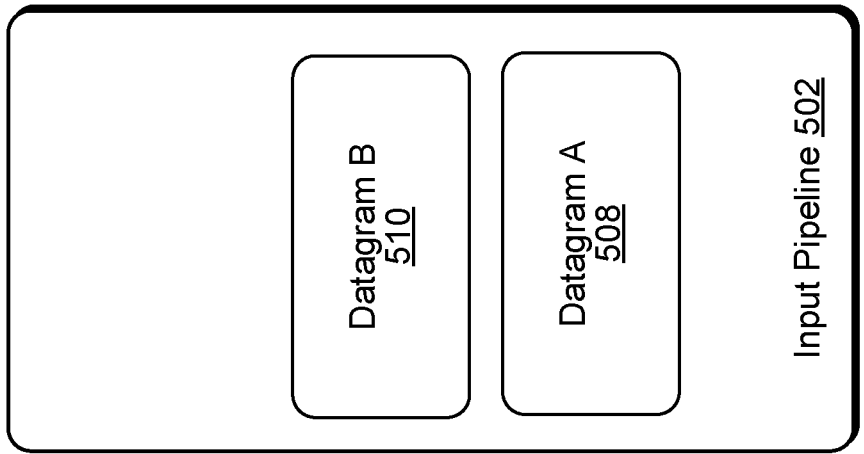

FIG. 5 provides an operational example 500 of storing two datagrams in an input pipeline 502 (e.g., the input pipeline 106 of the data correlation system 102 of FIGS. 1-2) while the pending pipeline (e.g., the pending pipeline 110 of the data correlation system 102 of FIGS. 1-2) and the output pipeline (e.g., the output pipeline 114 of the data correlation system 102 of FIGS. 1-2) are empty. In FIG. 5, the input pipeline 502 stores and receives datagram A 508 and datagram B 510 while the pending pipeline 504 and the output pipeline 506 are both empty.

Figure 6:
FIG. 6 provides an operational example of moving two datagrams from an input pipeline to a pending pipeline while storing a new datagram in an input pipeline.
Figure 6:
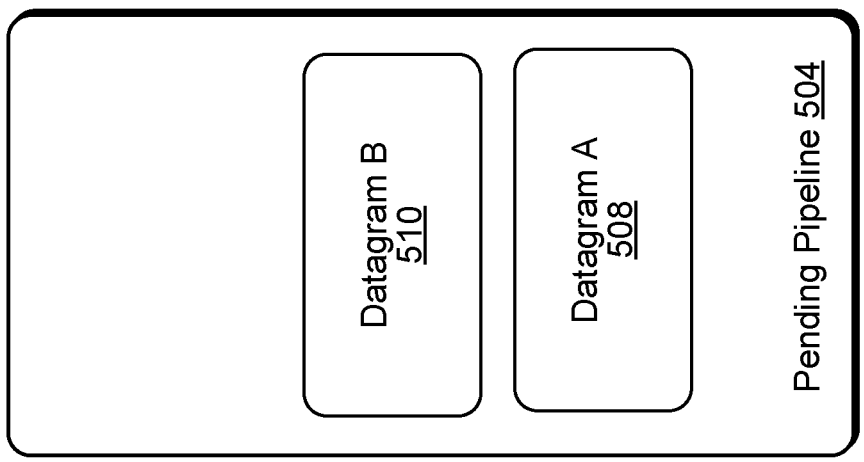
Figure 6:
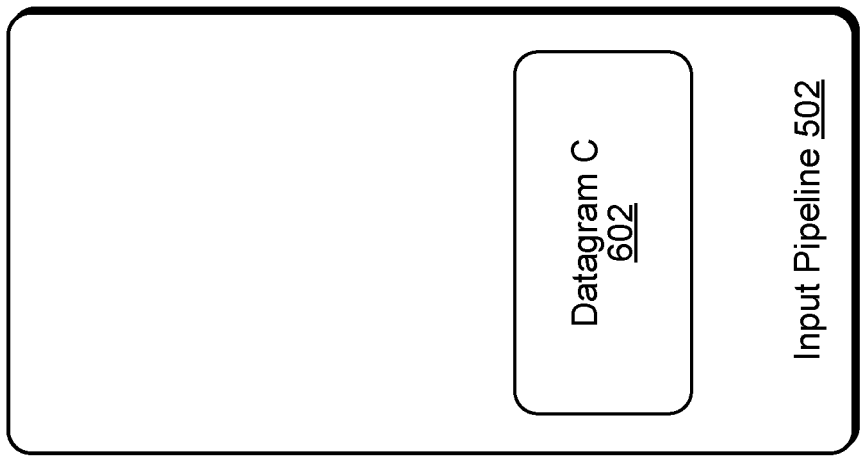

FIG. 6 provides an operational example 600 of moving two datagrams from the input pipeline 502 to the pending pipeline 504 while storing a new datagram in the input pipeline 502. In FIG. 6, the pending pipeline 504 stores datagram A 508 as a new datagram because datagram A 508 does not correlate with any datagrams stored on the pending pipeline 504 (as the pending pipeline 504 is empty before the addition of the new datagram corresponding to datagram A 508). Furthermore, the pending pipeline 504 also stores datagram B 510 as a new datagram because datagram B 510 does not correlate with any datagrams stored on the pending pipeline 504 (which implies that datagram A 508 and datagram B 510 do not correlate). Moreover, the input pipeline 502 receives and stores a datagram C 602, while the output pipeline 506 remains empty.

Figure 7:
FIG. 7 provides an operational example of updating a datagram stored in a pending pipeline while storing a new datagram in an input pipeline.
Figure 7:
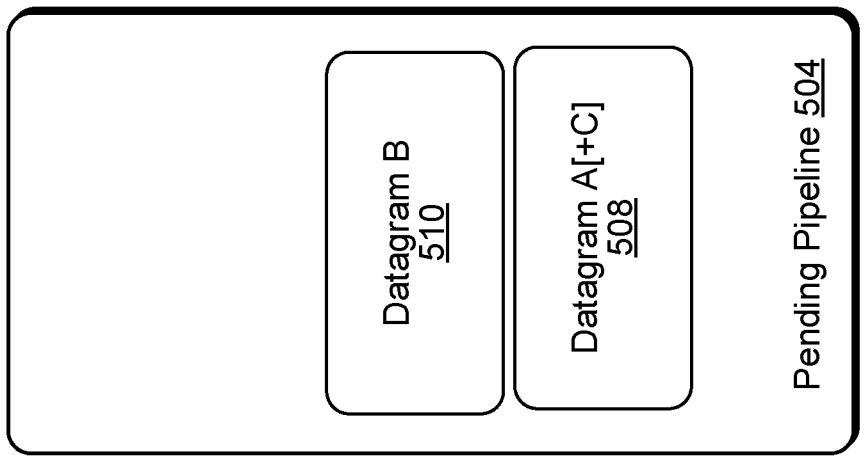
Figure 7:
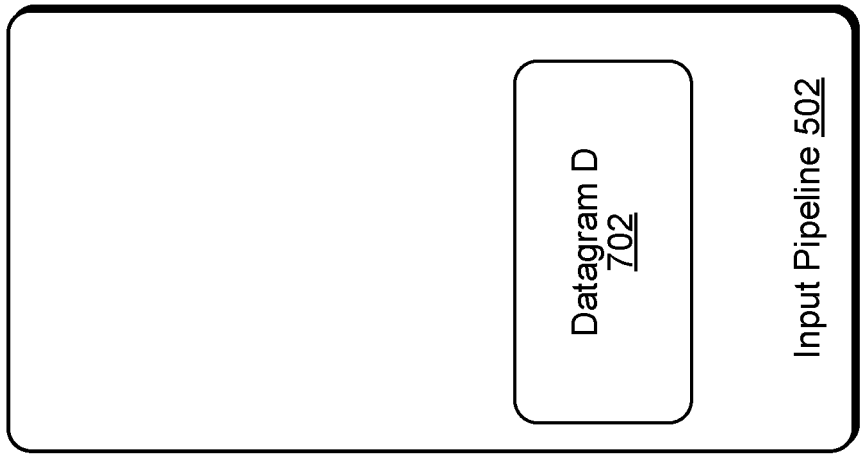

FIG. 7 provides an operational example 700 of updating a datagram stored in the pending pipeline 504 while storing a new datagram in the input pipeline 502. In FIG. 6, because datagram C 602 correlates with datagram A 508 that is currently stored on the pending pipeline 504, the system updates datagram A 508 to integrate fields associated with datagram C 602. Furthermore, because datagram C 602 does not correlate with datagram B 510 that is currently stored on the pending pipeline 504, the system does not integrate fields associated with datagram C 602 into datagram B 510. Moreover, the input pipeline 502 receives and stores a datagram D 702, while the output pipeline 506 remains empty.

Figure 8:
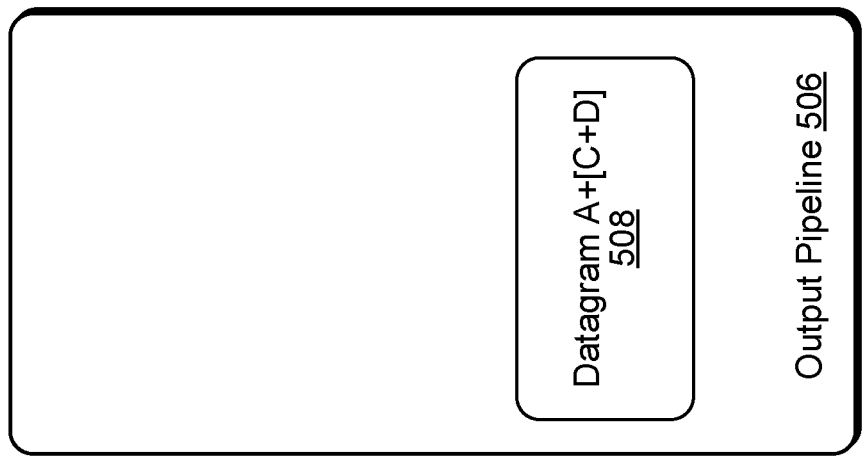
FIG. 8 provides an operational example of moving a datagram stored in a pending pipeline to an output pipeline while storing a new datagram in an input pipeline.
Figure 8:
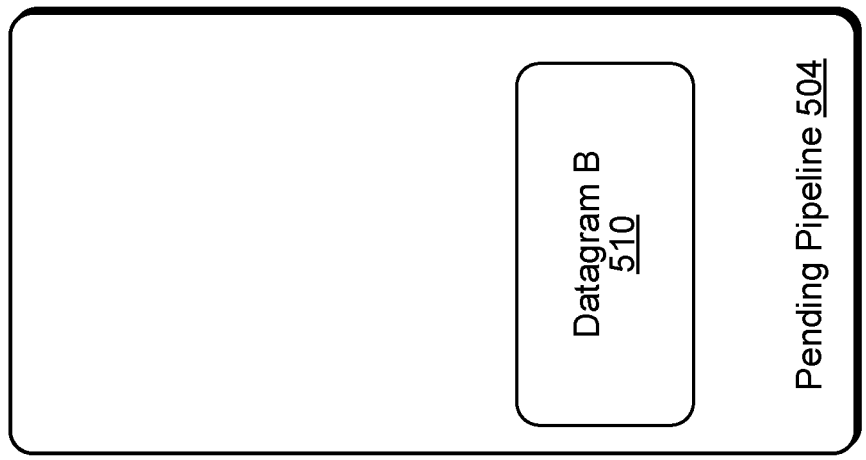
Figure 8:
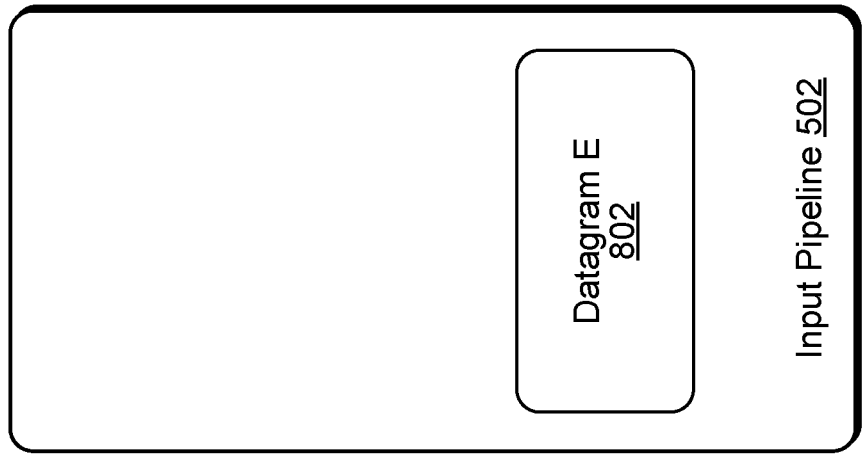

FIG. 8 provides an operational example 800 of moving a datagram stored in the pending pipeline 504 to the output pipeline 506 while storing a new datagram in the input pipeline 502. In FIG. 8, because datagram D 702 correlates with datagram A 508 that is currently stored on the pending pipeline 504, the system updates datagram A 508 to integrate fields associated with datagram D 702. In addition, because datagram A 508 (after integrating fields of datagram C 602 and datagram D 702) satisfies a completion criterion, the system moves datagram A 508 into the output pipeline 506. Moreover, the input pipeline 502 receives and stores a datagram E 802.

Figure 9:
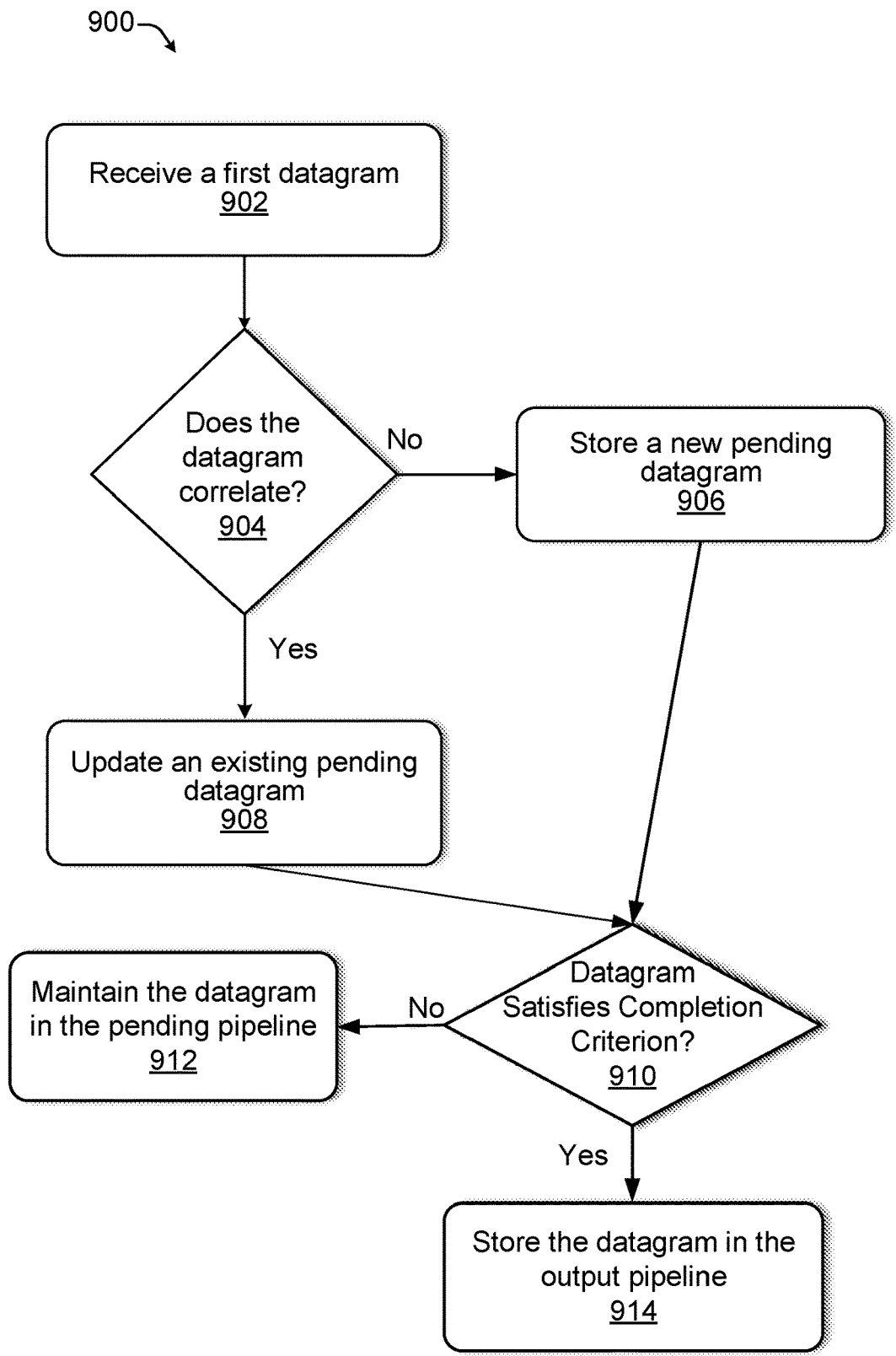
FIG. 9 is a flowchart diagram of an example process for correlating data across a group of data sources.

FIG. 9 is a flowchart diagram of an example process 900 for correlating data across a group of data sources. As depicted in FIG. 9, at operation 902, the process 900 receives a first datagram using an input pipeline. In some examples, when a data source monitoring system detects an update to a data source, the data source monitoring system may determine a first datagram corresponding to the update and store the first datagram on the input pipeline.

At operation 904, the process 900 determines whether the first datagram correlates with at least one datagram stored on a pending pipeline. In some examples, if the pending pipeline stores N datagrams, the correlation unit may perform N correlation determinations, each determining whether a datagram retrieved from the input pipeline correlates with a corresponding one of the N datagrams stored on the pending pipeline.

At operation 906, the process 900 includes storing the first datagram as a new pending datagram on the pending pipeline based on (e.g., in response to) determining that the first datagram fails to correlate with any datagrams stored on the pending pipeline. Accordingly, if the first datagram does not correlate with an existing datagram stored on the pending pipeline, the correlation routine stores a new datagram on the pending pipeline based on the first datagram.

At operation 908, the process 900 includes updating an existing pending datagram of the pending pipeline (e.g., in response to) determining that the first datagram fails correlates with at least one of the datagrams stored on the pending pipeline. In some examples, if the correlation routine determines that a first datagram retrieved from the input pipeline correlates with a second datagram stored on the pending pipeline, the correlation routine updates the second datagram in accordance with the second datagram.

At operation 910, the process 900 includes determining whether the pending datagram (as determined at operation 906 or updated at operation 908) satisfies a completion criterion. The completion criterion may describe one or more completion conditions, each describing a set of fields.

At operation 912, the process 900 includes maintaining the pending datagram in the pending pipeline based on (e.g., in response to) determining that the pending datagram does not satisfy the completion criterion. In some examples, based on (e.g., in response to) determining that a datagram retrieved from the pending pipeline fails to satisfy the completion criterion, the completion verification routine maintains the datagram on the pending pipeline.

At operation 914, the process 900 includes storing the pending datagram in the output pipeline based on (e.g., in response to) determining that the pending datagram satisfies the completion criterion. In some examples, based on (e.g., in response to) determining that a datagram retrieved from the pending pipeline satisfies the completion criterion, the completion verification routine stores the datagram on the output pipeline. In some examples, storing the pending datagram in the output pipeline includes providing an instruction (e.g., an application programming interface (API) call) to another device to store the pending datagram on the output pipeline.

Figure 10:
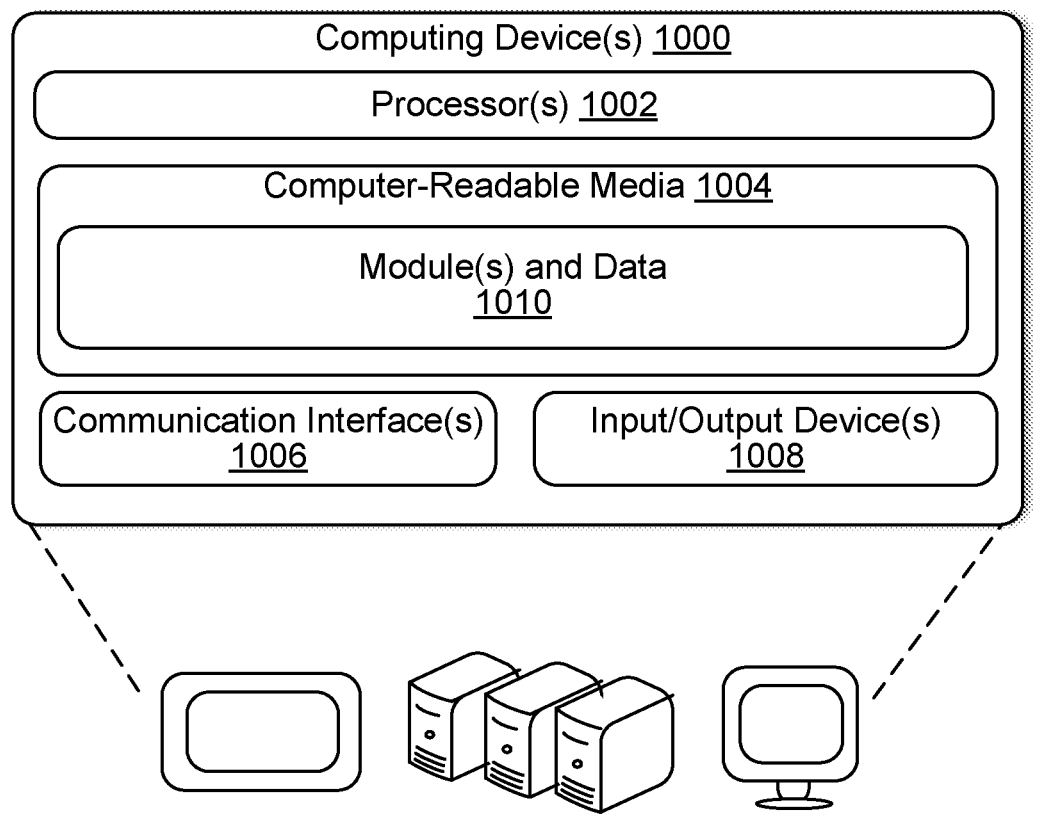
FIG. 10 illustrates example computing device(s) for performing techniques described herein.

FIG. 10 illustrates example computing device(s) 1000 for performing techniques described herein. The computing device(s) 1000 can comprise user device(s) including, but not limited to, mobile phone(s), personal digital assistant(s), netbook(s), laptop computer (s), desktop computer(s), networked computer(s), and/or any another electronic device(s) that are capable of transmitting or receiving data), server computing device(s). In some examples, the computing device(s) 1000 can comprise server computing device(s) (e.g., server(s)), which can be any type of server, such as a network-accessible server. In some examples, the server(s) can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed one or more remotely located devices instead of, or in addition to, the server(s).

In at least one example, the computing device(s) 1000 can include processor(s) 1002, computer-readable media 1004, communication interface(s) 1006, and input/output device(s) 1008.

The processor(s) 1002 can represent, for example, a central processing unit (CPU)-type processing unit, a graphics processing unit (GPU)-type processing unit, a Field-Programmable Gate Array (FPGA), another class of Digital Signal Processor (DSP), a quantum processor, or other hardware logic components that can, in some instances, be driven by a CPU and/or GPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 1002 can execute one or more modules and/or processes to cause the computing device(s) 1000 to perform a variety of functionalities, as set forth above and explained in further detail in the following disclosure. Additionally, each of the processor(s) 1002 can possess its own local memory, which also can store program modules, program data, and/or one or more operating systems.

Computer-readable media can include volatile memory, nonvolatile memory, and/or other persistent and/or auxiliary computer-readable media, removable and non-removable computer-readable media implemented in any method or technology for storage of data such as computer readable instructions, data structures, program modules, or other data. Computer memory is an example of computer-readable media. Thus, computer-readable media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain data for access by a computing device.

In at least one example, the computer-readable media can include non-transitory computer-readable media. Non-transitory computer-readable media can include volatile and nonvolatile, removable and non-removable tangible, physical media implemented in technology for storage of data, such as computer readable instructions, data structures, program modules, or other data. The computer-readable media 1004 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the computing device(s) 1000. Any such non-transitory computer-readable media can be part of the computing device(s) 1000.

In contrast, communication media includes computer readable instructions, data structures, program modules, or other data in a modulated data signal, such as a carrier wave, or other transmission mechanism. As defined herein, computer-readable media does not include communication media.

In at least one example, the computer-readable media 1004 can store module(s) and data 1010. The module(s) and data 1010 can be in the form of stand-alone applications, productivity applications, an operating system component, or any other application or software module.

The communication interface(s) 1006 can include one or more interfaces and hardware components for enabling communication with various other devices, such as over network(s) or directly. For example, communication interface(s) 1006 can enable communication through one or more networks, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, low power area networks (LPWAN) or any other such network, or any combination thereof. Components used for such communications can depend at least in part upon the type of network, the environment selected, or both. Protocols for communicating over such networks are well known and will not be discussed herein in detail.

In at least one example, the one or more input/output (I/O) devices 1008 can include speakers, a microphone, a camera, a display, a haptic output device, various user controls (e.g., buttons, a joystick, a keyboard, a keypad, etc.), and so forth.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation can be used in conjunction with components or steps of other examples. For example, the components and instructions of FIG. 10 can utilize the processes and flows of FIGS. 1-9.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some examples the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

EXAMPLE CLAUSES

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

A: A system comprising: one or more processors; and one or more computer readable media storing computer executable instructions that, when executed, cause the system to perform operations comprising: retrieving a first datagram from a first data structure, wherein the first datagram represents a first update to a first data source; determining, by a first routine, a first correlation between the first datagram and a second datagram that is stored in a second data structure; based on determining the first correlation, updating the second datagram in accordance with first datagram; determining, by a second routine, whether the second datagram satisfies a completion condition; and based on determining that the second datagram satisfies the completion condition, storing the second datagram in the first data structure.

B: The system of paragraph A, wherein the first routine is further configured to remove the first datagram from the first data structure.

C: The system of paragraph A or B, wherein the second routine is further configured to generate an incident alert based on determining that the second datagram satisfies an incident condition.

D: The system of any of paragraphs A-C, wherein determining whether the second datagram satisfies the completion condition is performed based on updating the second datagram.

E: The system of paragraph D, wherein: the second routine is subscribed to an event emitter routine for the second data structure, and the event emitter routine is configured to provide an update notification to the second routine based on updating the second datagram.

F: The system of any of paragraphs A-E, wherein the second routine is configured to remove the second datagram from the second data structure.

G: The system of paragraph F, further comprising: determining, by the second routine, that a third datagram stored in the second data structure fails to satisfy the completion condition; and maintaining, by the second routine, the third datagram in the second data structure based on determining that the third datagram fails to satisfy the completion condition.

H: The system of paragraph G, further comprising: determining, by the first routine, a second correlation associated with the third datagram and a fourth datagram stored in the second data structure; and updating the third datagram in accordance with the third datagram based on determining the second correlation.

I: The system of paragraph H, further comprising: determining, by the second routine, that the third datagram satisfies the completion condition; and storing the third datagram on the second data structure based on determining that the third datagram satisfies the completion condition.

J: The system of any of paragraphs A-I, further comprising: retrieving a fifth datagram stored in the first data structure; determining that the fifth datagram does not correlate with any datagrams stored on the second data structure; and based on determining that the fifth datagram does not correlate with any datagrams stored on the second data structure, storing the fifth datagram on the second data structure.

K: The system of any of paragraphs A-J, wherein a datagram in the first data structure is removed from the first data structure after a first time-to-live (TTL) period.

L: The system of any of paragraphs A-K, wherein a datagram in second first data structure is removed from the second data structure after a second time-to-live (TTL) period.

N: A method comprising: receiving a first datagram from a first data structure, wherein the first datagram represents a first update to a first data source; determining, by a first routine, a first correlation between the first datagram and a second datagram that is stored in a second data structure; based on determining the first correlation, updating the second datagram in accordance with first datagram; determining, by a second routine, whether the second datagram satisfies a completion condition; and based on determining that the second datagram satisfies the completion condition, storing the second datagram in the first data structure.

O The method of paragraph N, wherein the first routine is further configured to remove the first datagram from the first data structure.

P: The method of paragraph N, wherein the second routine is further configured to generate an incident alert based on determining that the second datagram satisfies an incident condition.

Q: The method of any of paragraphs N-P, wherein determining whether the second datagram satisfies the completion condition is performed based on updating the second datagram.

R: One or more non-transitory computer-readable media storing instructions executable by one or more processors, wherein the instructions, when executed, cause the one or more processors to perform operations comprising: obtaining a first datagram from a first data structure, wherein the first datagram represents a first update to a first data source; determining, by a first routine, a first correlation between the first datagram and a second datagram that is stored in a second data structure; based on determining the first correlation, updating the second datagram in accordance with first datagram; determining, by a second routine, whether the second datagram satisfies a completion condition; and based on determining that the second datagram satisfies the completion condition, storing the second datagram in the first data structure.

S The non-transitory computer-readable media of paragraph R, wherein the first routine is further configured to remove the first datagram from the first data structure.

T: The non-transitory computer-readable media of paragraph R, wherein the second routine is further configured to generate an incident alert based on determining that the second datagram satisfies an incident condition.

What is claimed is:

1. A system comprising:
one or more processors; and
one or more computer readable media storing computer executable instructions that, when executed, cause the system to perform operations, the operations comprising:
retrieving a first datagram from a first data structure, wherein:
the first datagram represents a first update to a first data source, and
the first data structure is configured to store a first set of datagrams that are received by the system;
determining, by a first routine, a first correlation between the first datagram and a second datagram that is stored in a second data structure, the second data structure being configured to store a second set of datagrams that have been processed by the first routine;
based on determining the first correlation, removing the first datagram from the first data structure and updating the second datagram in accordance with the first datagram;
determining, by a second routine, that the second datagram satisfies a completion condition; and
based on determining that the second datagram satisfies the completion condition, removing the second datagram from the second data structure and storing the second datagram in a third data structure, the third data structure being configured to store a third set of datagrams that satisfy the completion condition.

2. The system of claim 1, wherein the first routine is further configured to remove the first datagram from the first data structure.

3. The system of claim 1, wherein the second routine is further configured to generate an incident alert based on determining that the second datagram satisfies an incident condition.

4. The system of claim 1, wherein determining whether the second datagram satisfies the completion condition is performed based on updating the second datagram.

5. The system of claim 4, wherein:
the second routine is subscribed to an event emitter routine for the second data structure, and
the event emitter routine is configured to provide an update notification to the second routine based on updating the second datagram.

6. The system of claim 1, wherein the second routine is configured to remove the second datagram from the second data structure.

7. The system of claim 6, further comprising:
determining, by the second routine, that a third datagram stored in the second data structure fails to satisfy the completion condition; and
maintaining, by the second routine, the third datagram in the second data structure based on determining that the third datagram fails to satisfy the completion condition.

8. The system of claim 7, further comprising:
determining, by the first routine, a second correlation associated with the third datagram and a fourth datagram stored in the second data structure; and
updating the third datagram in accordance with the third datagram based on determining the second correlation.

9. The system of claim 8, further comprising:
determining, by the second routine, that the third datagram satisfies the completion condition; and
storing the third datagram on the third data structure based on determining that the third datagram satisfies the completion condition.

10. The system of claim 1, further comprising:
retrieving a fifth datagram stored in the first data structure;
determining that the fifth datagram does not correlate with any datagrams stored on the second data structure; and
based on determining that the fifth datagram does not correlate with any datagrams stored on the second data structure, storing the fifth datagram on the second data structure.

11. The system of claim 1, wherein a datagram in the first data structure is removed from the first data structure after a first time-to-live (TTL) period.

12. The system of claim 1, wherein a datagram in second first data structure is removed from the second data structure after a second time-to-live (TTL) period.

13. The system of claim 1, wherein the completion condition requires that a set of data fields be present.

14. A method comprising:
receiving a first datagram from a first data structure, wherein:
the first datagram represents a first update to a first data source, and
the first data structure is configured to store a first set of datagrams that are received by a system;
determining, by a first routine, a first correlation between the first datagram and a second datagram that is stored in a second data structure, the second data structure being configured to store a second set of datagrams that have been processed by the first routine;
based on determining the first correlation, removing the first datagram from the first data structure and updating the second datagram in accordance with the first datagram;
determining, by a second routine, that the second datagram satisfies a completion condition; and
based on determining that the second datagram satisfies the completion condition, removing the second datagram from the second data structure and storing the second datagram in a third data structure, the third data structure being configured to store a third set of datagrams that satisfy the completion condition.

15. The method of claim 14, wherein the first routine is further configured to remove the first datagram from the first data structure.

16. The method of claim 14, wherein the second routine is further configured to generate an incident alert based on determining that the second datagram satisfies an incident condition.

17. The method of claim 14, wherein determining whether the second datagram satisfies the completion condition is performed based on updating the second datagram.

18. The method of claim 17, wherein:
the second routine is subscribed to an event emitter routine for the second data structure, and
the event emitter routine is configured to provide an update notification to the second routine based on updating the second datagram.

19. One or more non-transitory computer-readable media storing instructions executable by one or more processors, wherein the instructions, when executed, cause the one or more processors to perform operations comprising:
obtaining a first datagram from a first data structure, wherein:
the first datagram represents a first update to a first data source, and
the first data structure is configured to store a first set of datagrams that are received by a system;
determining, by a first routine, a first correlation between the first datagram and a second datagram that is stored in a second data structure, the second data structure being configured to store a second set of datagrams that have been processed by the first routine;
based on determining the first correlation, removing the first datagram from the first data structure and updating the second datagram in accordance with the first datagram;
determining, by a second routine, that the second datagram satisfies a completion condition; and
based on determining that the second datagram satisfies the completion condition, removing the second datagram from the second data structure and storing the second datagram in a third data structure, the third data structure being configured to store a third set of datagrams that satisfy the completion condition.

20. The one or more non-transitory computer-readable media of claim 19, wherein the first routine is further configured to remove the first datagram from the first data structure.

* * * * *